No. 709,110. Patented Sept. 16, 1902.
O. R. OLSON.
LAWN OR HOUSE SWING.
(Application filed May 27, 1901.)
(No Model.) 2 Sheets—Sheet 2.
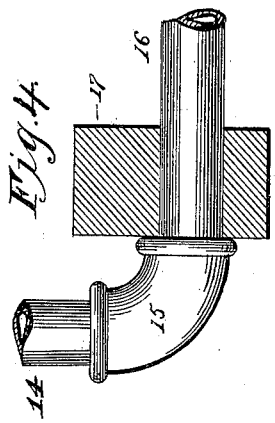
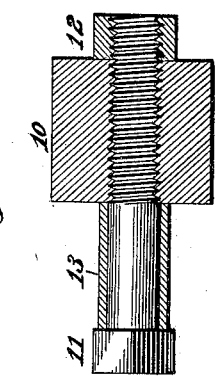
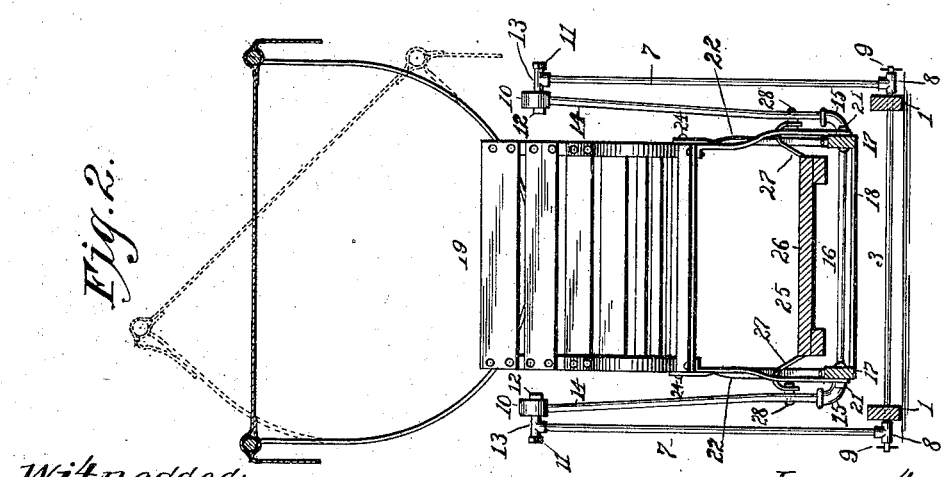
Witnesses:
Arthur McArthur
H. C. Rodgers
Inventor:
O. R. Olson.
By Fischer & Thorpe
Atty's

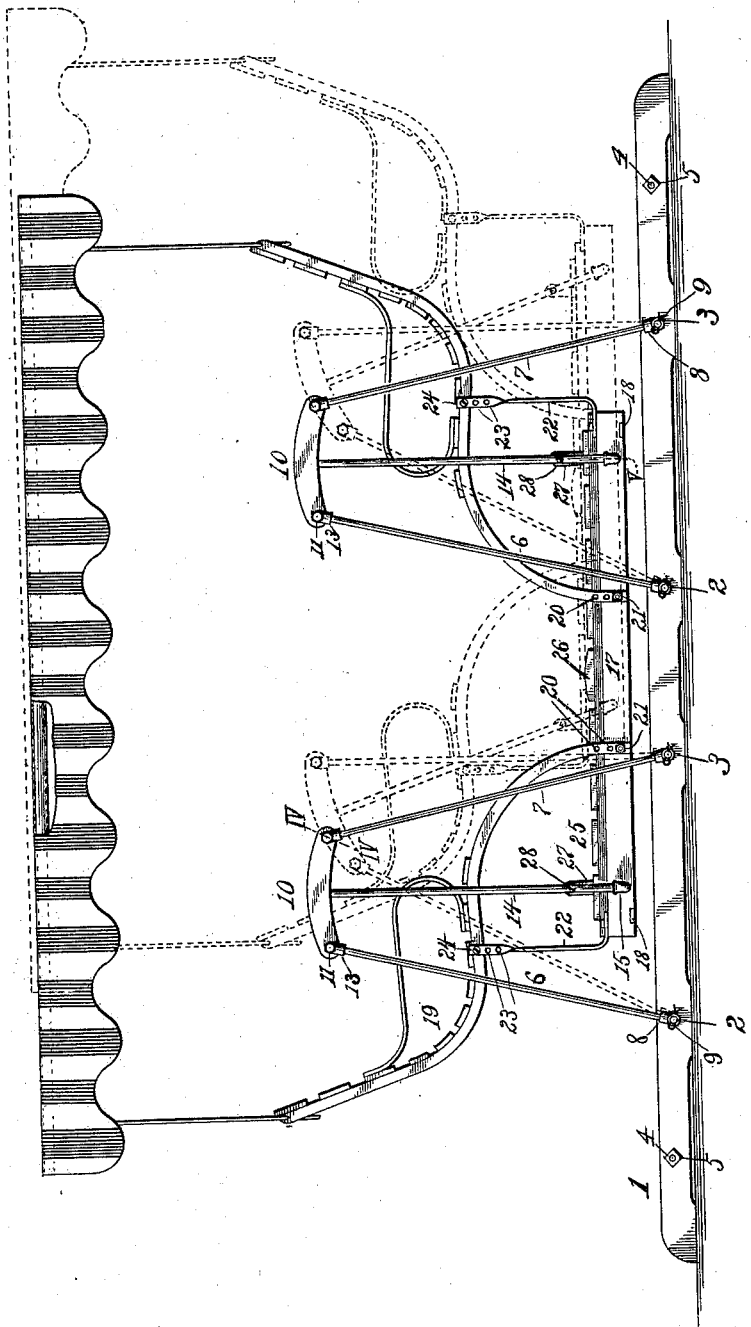

UNITED STATES PATENT OFFICE.

OLOF R. OLSON, OF KANSAS CITY, MISSOURI, ASSIGNOR TO HORIZONTAL SWING CO., OF KANSAS CITY, MISSOURI, A CORPORATION OF MISSOURI.

LAWN OR HOUSE SWING.

SPECIFICATION forming part of Letters Patent No. 709,110, dated September 16, 1902.

Application filed May 27, 1901. Serial No. 62,006. (No model.)

*To all whom it may concern:*

Be it known that I, OLOF R. OLSON, a citizen of the United States, residing at Kansas City, in the county of Jackson and State of Missouri, have invented certain new and useful Improvements in Lawn or House Swings, of which the following is a specification.

My invention relates to lawn or house swings, and is designed especially as an improvement on the similar swings on which Patents Nos. 678,192 and 678,349 were issued to me July 9, 1901, my object in this connection being to produce an open-top double swing which operates with but little exertion on the part of the operator and is of simple, strong, durable, and inexpensive construction.

The invention consists, essentially, in a base, a swinging frame mounted thereon, a chair-carrying frame pivotally suspended from the swinging frame, and a foot-platform pivotally suspended from the chair-carrying frame and adapted to be utilized as a lever for operating the swing.

The invention also consists in structural features hereinafter described and claimed, and in order that it may be fully understood reference is to be had to the accompanying drawings, in which—

Figure 1 represents a side view of a swing embodying my invention. Fig. 2 is a central cross-section of the same. Fig. 3 is an enlarged section taken on the line IV IV of Fig. 1. Fig. 4 is an enlarged section taken on the dotted line V of Fig. 1.

Referring to the drawings, where like reference-numerals designate corresponding parts, the base adapted to rest upon the lawn, porch, or other horizontal support consists, preferably, of a pair of longitudinal bars 1, connected together by rock-shafts 2 3, these shafts being preferably in the form of pipes to eliminate weight as much as possible. The bars may also be connected by cross-rods 4, engaged by nuts 5 to prevent inward or outward movement of the bars, though in practice these rods or braces are not really necessary. Frames pivotally mounted on said base to swing longitudinally thereof comprise standards 6 and 7, preferably converging upward at equal angles and coupled to the outer ends of shafts 2 and 3, respectively, by T-couplings 8, the latter being secured reliably thereto by spring-cotters 9 or equivalent devices, and in this connection it may be stated that the parts referred to as 2 and 3 may rock or may be stationary and the couplings turn thereon. The chair-carrying frame is constructed as follows:

10 designates links or arm-rests pivotally connecting the upper ends of swinging standards 6 7, the connection preferably being by means of screw-bolts 11, screwed into said links or arm-rests, retaining-nuts 12, engaging the inner ends of said bolts, and T-couplings 13, journaled upon the non-threaded portions of said bolts and secured to the upper ends of said standards. The links or arm-rests 10 are provided centrally with rigid depending stems 14, coupled at their lower ends by elbows 15 to horizontal transverse pipes 16. A pair of parallel bars 17, extending longitudinally in a horizontal plane, are pivotally mounted on pipes 16 and are connected together by cross-bars 18. Chairs 19 of the type shown or of any other suitable or preferred type are mounted facing each other as usual on opposite ends of bars 17, being provided for purposes of adjustment with a series of holes 20 at their front ends to engage with screw-bolts 21, carried by said bars. As a further support for the chairs angle-bars 22, bolted to the ends of bars 17, are provided, their upper ends being provided with a series of holes 23 to receive the securing-bolts 24, carried by the chairs. By engaging with bolts 21 24 different holes 20 and 23, respectively, it is obvious that the position of the seat may be varied—that is to say, the seat portion of the chair may be secured horizontal or at a slight angle to such position. The chairs therefore can be adjusted to the comfort of different occupants.

For the purpose of affording a support and fulcrum for the feet whereby the swing can be operated almost imperceptibly to an observer and with the least possible exertion on the part of the operator I provide a horizontal platform 25, preferably of skeleton construction and embodying a cross slat or slats 26 within convenient foot-reach of the occupants, which project preferably above the remaining portion of the platform to provide a good bearing-surface against which one or both of the occupants may push, this platform serving as a lever for imparting movement to the swing as a whole, because it is provided with brackets 27 at its opposite sides and ends, pivotally suspended from bolts 28, mounted in link-stems 14.

In practice, as above stated, one or both of the chair-occupants operate the swing by pressing forward and downward upon cross-slat 26 of the foot-lever platform, the swing moving oppositely to the direction in which such pressure is exerted. Where both occupants apply pressure on the foot-lever platform, they do so alternately, thereby applying pressure with each movement of and more rapidly operating the swing. The pressure upon the platform causes the latter while traveling in the same direction as the chair-carrying frame to also move oppositely thereto like a traveler walking toward the rear end of a moving car of which he is an occupant. The leverage thus obtained swings the lower ends of link-stems 14 slightly out of the perpendicular, and consequently moves the remainder of the chair-carrying frame and the occupants. This shifting of the weight instantly effects a response on the part of the swinging standards and causes the latter to move at their upper ends in the same direction.

In Fig. 1 the normal position of the swing is shown in full lines and about the limit of its movement in one direction in dotted lines, and it will be noticed that the movement of the swing as proportioned is almost in a horizontal plane, with a slight gradual rise as it terminates. By proportioning the parts differently it is possible to cause the swing to travel back and forth in a horizontal plane or to rise to a greater altitude at the ends of its movement than is shown by the drawing.

The swing as shown in Figs. 1 and 2 is provided with an awning to protect the occupants, which, however, is not described, as it obviously forms no part of the present invention.

The particular construction which I illustrate and describe for uniting the parts together is obviously susceptible of change, and, in fact, the entire structure may be varied in numerous particulars as regards its form, proportion, detail construction, and arrangement of the parts without departing from the essential spirit and scope or sacrificing any of its advantages, and although it may be of minimum weight it possesses in a high degree the desirable features of simplicity, strength, durability, and cheapness of construction.

Having thus described the invention, what I claim as new, and desire to secure by Letters Patent, is—

1. A lawn or house swing, comprising standards pivoted to swing back and forth at their upper ends, links pivotally connecting the upper ends of the standards and provided with rigid depending stems, a platform pivotally carried by said stems, a chair rigidly mounted on said platform, and a foot-lever platform pivotally suspended from said stems, substantially as described.

2. A lawn or house swing, comprising standards pivoted to swing at their upper ends, links pivotally connecting their upper ends, a stem depending rigidly from each link, a frame pivotally attached to said stems, chairs rigidly mounted on said frame, a foot-lever platform, and brackets secured rigidly to and projecting from the same and pivoted at their upper ends to said stems, substantially as described.

3. A lawn or house swing, comprising a base, cross-rods mounted therein, standards connected at their lower ends to said rods to swing back and forth at the upper ends, links pivotally connecting the upper ends of said standards, stems rigidly depending from the links, a chair-carrying frame pivotally connected to the lower ends of said stems, and a foot-lever platform pivotally suspended from said stems, substantially as described.

4. A lawn or house swing, comprising a base, two sets of standards pivotally mounted on said base, links connecting the upper ends of the standards of each set, and provided with rigid depending stems, a horizontal frame pivotally attached to the lower ends of said stems near its opposite ends, chairs rigidly mounted on the opposite ends of said frame, and a foot-lever platform pivotally suspended from said stems, substantially as described.

5. A lawn or house swing, comprising a base, two sets of standards pivotally mounted on said base, links connecting the upper ends of the standards of each set, and provided with rigid depending stems, a horizontal frame pivotally attached to the lower ends of said stems near its opposite ends, chairs rigidly mounted on the opposite ends of said frame, a foot-lever platform, and brackets secured to and projecting from the same, and pivoted to said stems above the chair-carrying frame, substantially as described.

6. In a swing, the sills, the standards pivotally carried therein, the latter being widely separated at their pivotal ends and converging toward their upper ends, a link loosely connected at each end to one of the said standards, the arms rigidly secured in the links and depending therefrom, the platform suspended on the said arms, the seats carried on the platform and the foot-platform beneath the seats, and the hangers for carrying said foot-platform as set forth and all being arranged substantially in the manner and for the purposes herein described.

7. In a swing, a platform for carrying the seats, arms pivoted to said platform for carrying it, a supporting-frame for the swing, pivotal standards carried therein and converging toward their upper ends, a link to which said upper ends are pivoted, said standards pivoted at their lower ends and widely separated, the carrying-arms of said platform being rigidly secured to and hung from the links, the standards thus arranged adapted to limit the movement of the swing, as set forth.

8. In a swing, the combination of the standards supported pivotally at their lower ends and separated as shown and converging at their upper ends, a supporting-frame for carrying said standards at their lower ends, the links having one of the said standards pivoted at each end thereof, the depending arms secured to the links, the platform suspended on said arms, the seats on said platform and the foot-platform pivotally hung from the arms, all arranged substantially as and for the purposes set forth and described.

In testimony whereof I affix my signature in the presence of two witnesses.

OLOF R. OLSON.

Witnesses:
    H. C. RODGERS,
    G. Y. THORPE.